No. 657,699. Patented Sept. 11, 1900.
C. HEART.
WHEEL.
(Application filed Jan. 29, 1900.)
(No Model.)
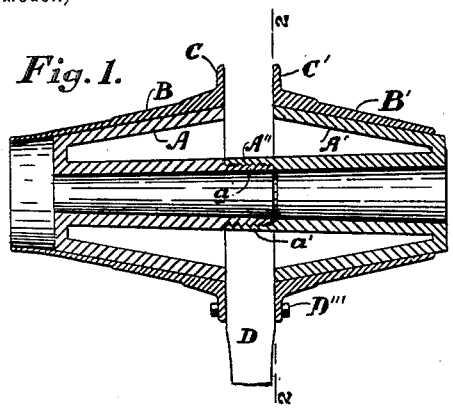
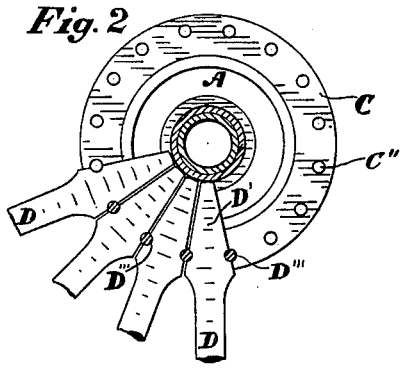
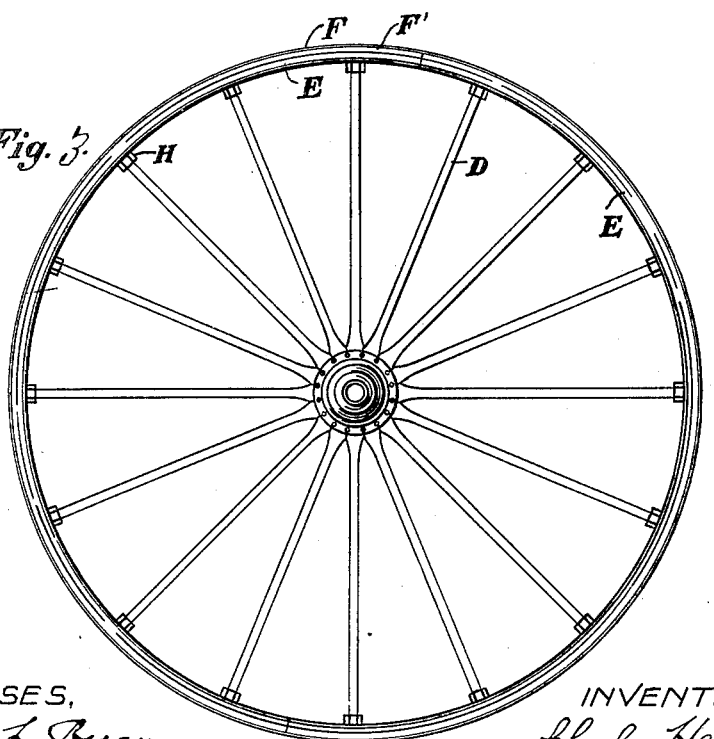
WITNESSES,
Thomas L. Ryan
L. O. Howard
INVENTOR.
Charles Heart,
by
W. DuVal Brown
ATTORNEY.

UNITED STATES PATENT OFFICE.

CHARLES HEART, OF FRANKTON, INDIANA, ASSIGNOR OF ONE-HALF TO WILLIAM H. H. QUICK, OF ANDERSON, INDIANA.

WHEEL.

SPECIFICATION forming part of Letters Patent No. 657,699, dated September 11, 1900.

Application filed January 29, 1900. Serial No. 3,134. (No model.)

*To all whom it may concern:*

Be it known that I, CHARLES HEART, a citizen of the United States, residing at Frankton, in the county of Madison and State of Indiana, have invented a new and useful Wheel, of which the following is a specification.

My invention relates to an improvement in hubs for wheels wherein the various parts of the hub are made of metal, preferably iron or steel, the object being to construct a metal hub which will be strong and light and one in which the parts can be readily assembled. These and other objects not hereinbefore mentioned are accomplished by the construction shown in the accompanying drawings, wherein like letters of reference indicate corresponding parts in the several views, and in which—

Figure 1 is a vertical central longitudinal section through the hub. Fig. 2 is a cross-section on the line 2 2, Fig. 1. Fig. 3 is a side elevation of the wheel complete.

As shown in Fig. 1, the hub proper consists of two portions A A', screwed together at A''. These two portions are adapted to be made of metal, hollowed out and having their inner ends open. The outer parts or rims of these portions flare outwardly and do not meet, leaving a space for the spokes, as hereinafter described. The central part has projections $a$ and $a'$, respectively, on which the screw-threads are placed.

Around each portion A A' of the hub is secured a band of metal B B', respectively. These bands fit snugly over the inner portions and extend inwardly, so as to have their inner ends flush with the inner ends of the rims of the portions A A'. On the inner ends of these bands are formed the annular flanges C C', respectively. These flanges are provided with the apertures C'', as plainly shown in Fig. 2.

In assembling the hub the bands are first shrunk upon the inner portions A A'. These portions are then screwed together tightly until the apertures in the flanges are in a straight line, when the hub is ready for the spokes.

The spokes D are intended to be made of metal pressed into shape. The inner ends of these spokes are squared and formed wedge-shaped, as shown at D'. On each side of this squared wedge-shaped inner portion is formed a groove D''. The spokes are placed between the two portions of the hub, as shown in Figs. 1 and 2, and bolts D''' passed between the spokes resting in the grooves, as shown in Fig. 2. These bolts are then tightened, securely fastening the spokes to the hub.

By hollowing out the inner portions of the hub I make an exceedingly-light hub when assembled, and by shrinking on the rim I greatly strengthen the whole. It will also be seen that by first screwing the two parts of the hub together and then securing the parts by the bolts, which also fasten the spokes in place, I provide a hub which is easily but securely assembled.

Having thus described my invention, what I claim as new, and desire to secure by Letters Patent, is—

1. A hub consisting of two hollowed-out portions having their inner ends open, the central part of each portion having a projection provided with a screw-thread whereby the portions are secured together, and the rims of these two portions not meeting leaving a space, a band shrunk on each portion having its inner end flush with the inner end of the rim, an annular flange on the inner end of each band provided with apertures, and bolts passing through the apertures adapted to act to further secure the two portions of the hub together and also to fasten the spokes.

2. A hub consisting of two hollowed-out portions having their inner central parts secured together, and the inner ends of the rims of these portions being spaced apart, a band shrunk on each portion, having their inner ends flush with the rims, an annular flange on the inner end of each band provided with apertures, spokes positioned between the inner ends of the bands and rims of the two portions, and bolts passing through the apertures in the flanges and between each spoke for securing the spokes in position and further securing the two portions of the hub together.

In testimony whereof I have hereunto affixed my signature in the presence of two witnesses.

CHARLES HEART.

Witnesses:
J. E. WADE,
WM. DUVAL BROWN.